Jan. 12, 1965 H. W. KUMRO 3,165,004
SHAFT MOUNT INTEGRAL DRIVE UNIT
Filed May 29, 1962 3 Sheets-Sheet 1
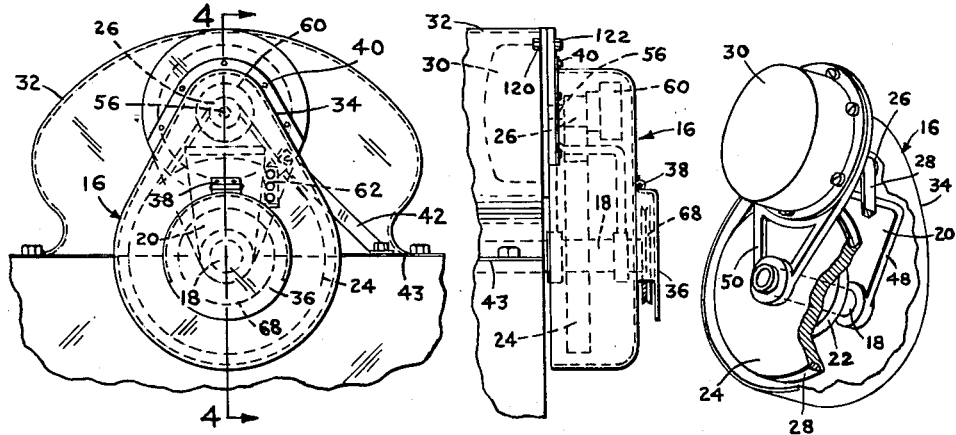
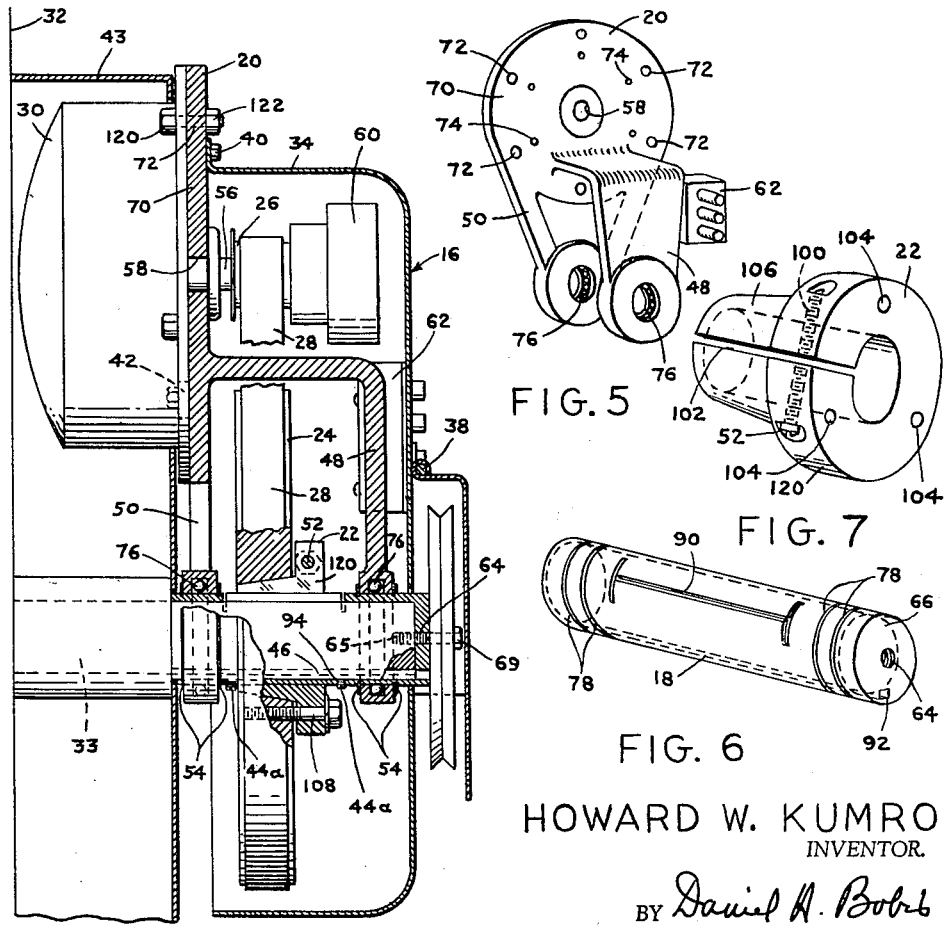
HOWARD W. KUMRO
INVENTOR.
BY Daniel H. Bobb
Atty Jan. 12, 1965     H. W. KUMRO     3,165,004
SHAFT MOUNT INTEGRAL DRIVE UNIT Filed May 29, 1962     3 Sheets-Sheet 2

HOWARD W. KUMRO
INVENTOR.

BY Daniel D. Bobis
Atty

Jan. 12, 1965  H. W. KUMRO  3,165,004
SHAFT MOUNT INTEGRAL DRIVE UNIT
Filed May 29, 1962  3 Sheets-Sheet 3
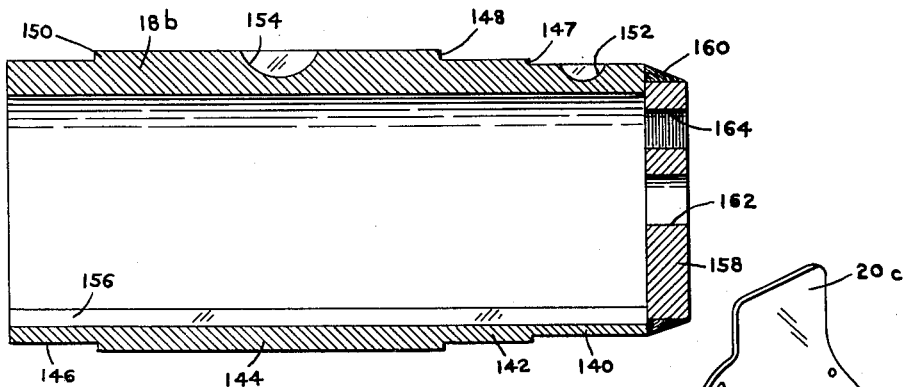
FIG. 12
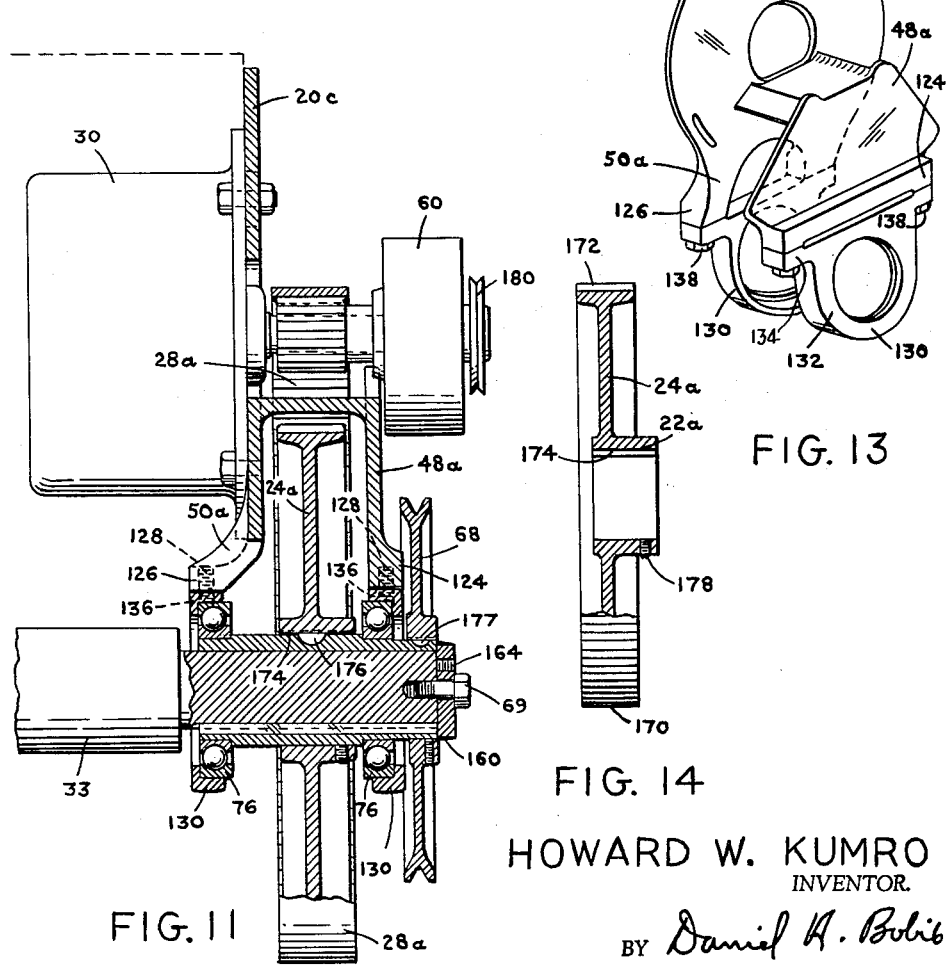
FIG. 13
FIG. 14
FIG. 11
HOWARD W. KUMRO
INVENTOR.
BY Daniel H. Bolib
Atty United States Patent Office 3,165,004
Patented Jan. 12, 1965

3,165,004
SHAFT MOUNT INTEGRAL DRIVE UNIT
Howard W. Kumro, Oil City, Pa., assignor to Worthington Corporation, Harrison, N.J., a corporation of Delaware
Filed May 29, 1962, Ser. No. 198,551
2 Claims. (Cl. 74—219)

This invention relates generally to a shaft mount integral drive unit. More particularly the invention relates to a shaft mount integral drive for card and other motor driven machinery.

The use of shaft mounted drive units for card and other motor driven machinery is well known in the art but prior devices required that the shaft mounted drive be fitted to the machine. Furthermore, the shaft mounted drive had to be aligned and positioned on the machine to obtain the assembled position. The time necessary to complete the assembly operation would be dependent upon the personnel and their particular skill.

It is the object of the present invention to increase the assembly efficiency by using the novel shaft mount integral drive unit which eliminates many of the steps previously required in the assembly operation.

In accordance with the present invention the shaft mount integral drive unit to be mounted on a shaft to be driven thereby comprises a first means adapted to be mounted on the shaft and a second means rotatably mounted on the first means in operative association therewith. A motor is connected to the second means and there is a third means connected between the motor means and the first means which is adapted to transmit the motor power of the motor to the first means to rotate the first means and the shaft.

One of the objects of this invention is to make the mounting of the integral drive unit on the shaft of the driven machine a simple operation.

Another object of this invention is to eliminate the need of fitting the drive unit to the machine as required in existing drive units.

Another object of this invention is to make a complete and compact integral drive unit for any equipment that can be belt or chain driven.

Another object of this invention is to convert any machine operated by a multi-drive unit to individual motor drive unit with no more effort than is normally required to mount a driven pulley.

Still another object of this invention is to provide for the addition of accessory items such as a clutch and/or auxiliary pulley and/or stripper pulley to the integral drive unit.

Still another object of this invention is to provide for the easy removal of the integral drive unit from the shaft.

With these and other objects in view, as may appear from the accompanying specification, the invention consists of various features of construction and a combination of parts which will be first described in connection with the accompanying drawings showing the novel shaft mount integral drive unit of a preferred form and the features forming the invention will be specifically pointed out in the claims.

In the drawings:

FIGURE 1 is a perspective view from the inward end of the shaft mount integral drive unit.

FIGURE 2 is an end elevation of one form of the shaft mount integral drive unit mounted on a mechanism.

FIGURE 3 is a front elevation of one form of the shaft mount integral drive unit of FIGURE 2.

FIGURE 4 is a cross-sectional view taken along line 4—4 of FIGURE 3.

FIGURE 5 is a perspective view of one form of the frame bracket.

FIGURE 6 is a perspective view of one form of the sleeve.

FIGURE 7 is a perspective view of one form of the hub.

FIGURE 11 is a cross-sectional view of still another form of the invention

FIGURE 12 is a cross-sectional view of the sleeve of FIGURE 11.

FIGURE 13 is a perspective view of the frame member of FIGURE 11.

FIGURE 14 is a cross-sectional view of the drive pulley of FIGURE 12.

Figure 9:
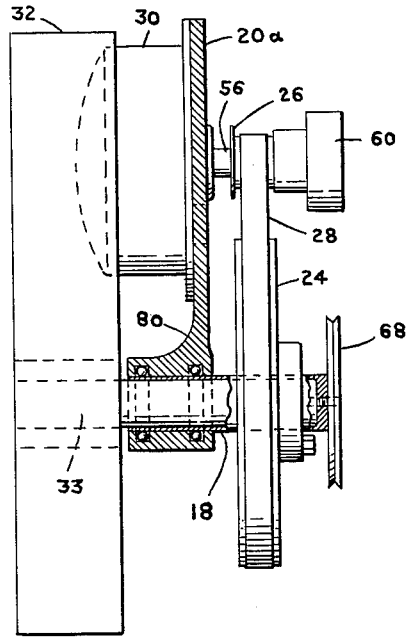
FIGURE 9 is a cross-sectional view of a modified form of the invention.

Referring more particularly to the drawings FIGURE 1 shows one form of the shaft mount integral drive unit 16. This unit consists of a sleeve 18, a frame member 20, a hub 22, a driven pulley 24, a driver pulley 26, a connecting belt 28 and a motor 30. In some applications of this unit a driven pulley 24a having an integrally formed hub 22a thereon which can be bored to suit is used. The operable assembly of the unit will be more fully set forth hereinafter.

The shaft mount integral drive unit 16 as illustrated in operable assembly in FIGURES 2 and 3 is seen mounted on a carding machine 32 but it is understood that any motor driven machine would be equally adapted to use the invention. Therefore, it is understood that the use of this invention is not limited to use with carding machines but is intended for use with any type motor driven machinery.

Shaft mount integral drive unit 16 is shown with a cover 34, the front 36 of which is hinged as at 38. Cover 34 can be opened during certain operations or for inspection of the shaft mount integral drive unit 16. It is understood that the cover can be widely modified or completely eliminated and that its use is optional.

The unit is conveniently factory assembled and thereafter shipped to the place of ultimate use. The assembled unit 16 minus the cover 34 is readily assembled on the shaft 33 of the motor driven machine 32 by simply sliding the sleeve 18 in place and securing it as more fully set forth hereinafter.

The cover 34 is conveniently secured to the frame member 20 as for example by means of bolts 40. A torque arm 42 is connected to the frame member 20 and secured to the shroud 43 of the motor driven machinery 32 to prevent the shaft mount integral drive unit 16 from rotating about the shaft 33 during operation of the motor 30.

One operable assembly of the shaft mount integral drive unit 16 is shown in FIGURE 4 in which the sleeve 18 is secured to the shaft 33 of the driven machinery after being placed thereon. This may be done in any suitable way, as for example, it may be secured by the compression force of the hub 22 or by set screws 44 extending from the sleeve 18 into the shaft 33. A further example of how the sleeve could be secured to the shaft is by means of a key 46 held in position by set screw 44a.

*Factory Assembly Operation*

One way of assembling unit 16 at a factory site is as described hereinafter.

FIGURE 7 shows hub 22 split but it is understood that any suitable construction may be used. The hub 22 is placed between the legs 48 and 50 of the frame member 20 and each is secured to the sleeve. The hub 22 is secured by tightening of bolt 52 and the frame member 20 by means of snap rings 54 placed on either side of the legs 48 and 50. The motor 30 is mounted to the frame member 20 in any suitable fashion such as by bolts 120. The shaft 56 of the motor 30 extends through an opening 58 in the frame member 20 and has mounted thereon a driver pulley 26. Mounted on the hub 22 is a driven pulley 24 and it is understood that hub 22 and pulley 24 can be formed integrally. A belt 28 is connected between the two whereby on operation of the motor 30 the motive power will be transmitted from the driver pulley 26 to the driven pulley 24.

It is understood that the term belt includes a positive or timing belt, a V or poly-V belt, and a flat belt. Furthermore, it is within the scope of this invention to use any other suitable connecting means instead of a belt such as a chain (not shown).

The switch 62 which controls the motor 30 may be conveniently mounted inside the cover 34 or fixed to the frame member 20. A clutch 60 can be connected to the shaft 56 of the motor 30 outwardly of the driver pulley 26 in order to provide for soft starts so that the full driving power of the motor is not immediately transmitted to the driven pulley 24 but instead allows for the gradual build-up of full power.

Switch 62 operates the motor 30 and can be any convenient type having controls of "Start," "Stop" and "Reverse." Such type switches are readily available on the open market. Switch 62 is connected between the motor leads (not shown) and a source of electrical power (not shown).

Sleeve 18 can be conveniently provided with a threaded bore 64 at the blind end 66 thereof upon which an auxiliary pulley 68 can be connected by bolt 69 which extends through threaded bore 64 and into threaded bore 65 in shaft 33. Pulley 68 can be used to power any auxiliary equipment.

FIGURE 5 illustrates the frame member 20 in which we see legs 48 and 50 extending from the main body 70 thereof. The motor 30 is mounted on the main body in any suitable way as for example by having bolts 120 pass through the motor flange 118 and holes 72 of the main body 70 to engage nuts 122. The cover 34 is connected to the main body 70 for example as by means of threaded holes 74 inwardly of the motor mount holes 72. Frame member 20 has legs 48 and 50 which extend therefrom and the ends of which have bearings 76 formed integrally with each leg. Sleeve 18 is extended through these bearings 76 and is thereby seated in rotatable fashion. The frame member 20 is secured to the sleeve 18 as previously described by snap rings 54 placed in grooves 78 in sleeve 18 on either side of the bearings 76. In this construction legs 48 and 50 will straddle the driven pulley 24 and afford a suitably balanced support for the motor 30 and other equipment thereon.

However, in certain operations it may be desirable to use the construction shown in FIGURE 9 in which the frame member 20a has only one leg 80 extending therefrom having bearing 76 seated therein to rotatably mount the frame member 20a of the sleeve 18.

Figures 8, 10:
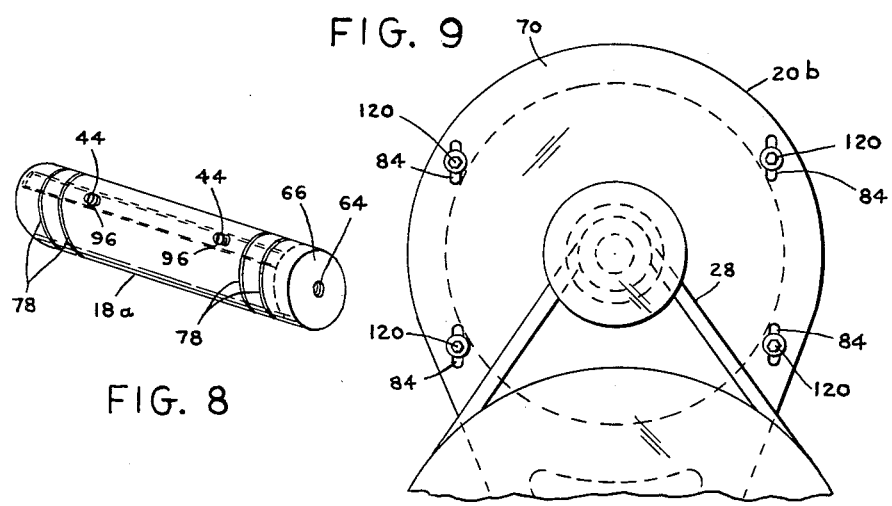
FIGURE 8 is a perspective view of a modified sleeve.
FIGURE 10 is a modified form of the invention showing a means of changing the tension on the belt.

A further modification of the frame member may be accomplished as shown in FIGURE 10 in which frame member 20b is shown having the motor mounted thereon. The position of the shaft of the motor can be adjusted on mounting the motor 30 in slots 84 by positioning the motor 30 to the right or left in slots 84 and fixing it as desired. Member 20b can also be used to change the tension of the belt 28.

Another modification of the frame member shown in FIGURE 13 in which frame member 20c has legs 48a and 50a which have flanges 124 and 126 respectively formed thereon. Flanges 124 and 126 have tapped holes 128 therein. Bearings 76 are disposed in holder elements 130 which have outer annular inwardly extending radial flanges 132 which prevent outward displacement of bearings 76. Flanges 134 are formed on the upper end of elements 130 and have holes 136 therein. Holder elements 130 can be disposed onto sleeve 18 after hub 22 is connected thereto and subsequently frame member 20c has legs 48a and 50a connected to elements 130 by passing bolts 138 through holes 136 to threadedly engage holes 128 thus obtaining operable assembly.

One form of the sleeve 18 is shown in FIGURE 6 in which sleeve 18 has a slot 90 therein. It is understood that hub 22 can be bored to suit and can be secured to sleeve 18 by the turning of bolt 52 which compresses the split thereby providing for positive connection by way of the compression of the hub onto the sleeve. Also the drawing of the pulley 24 on the tapered outer section 106 compresses the split 90 and positively connects the sleeve 18 to the shaft 33.

The threaded bore 64 in the blind end 66 of sleeve 18 can be used not only for connecting auxiliary pulleys 68 to sleeve 18 but can serve the further useful purpose of providing a convenient means for disengaging sleeve 18 from shaft 33 to thereby remove unit 16 from shaft 33.

An additional opening 92 is provided in the blind end 66 through which key 46 may be extended to secure sleeve 18 to shaft 33. Key 46 can be held in position by a set screw 44a extending through a bore 94 in the circumference of the sleeve 18 in the outer end thereof.

A modified form of sleeve 18a is shown in FIGURE 8 in which instead of a slot 90 the sleeve has two spaced tapped holes 96 in which set screws 98 are positioned to engage the key 46 which is engageably disposed between the sleeve 18 and shaft 33.

Still another sleeve is shown in FIGURE 12 in which sleeve 18b has a stepped outboard end of increasing diameter designated as sections 140, 142 and 144. Section 146 is inwardly of section 144 and has the same diameter and length as section 142. Adjacent each smaller diametered section shoulders 147, 148 and 150 are formed on sections 142 and 144 respectively. Woodruff keyways 152 and 154 are formed in sections 140 and 144 respectively in which the auxiliary pulley 68 and driven pulley 24a will be bored to suit and fixedly connected thereto. Holder elements 130 are disposed on either side of driven pulley 24a and shoulders 148 and 150 restrain the inner ends of bearings 76 while the outer ends of bearings 76 will be held in position by flanges 132. Keyway 156 runs the length of the sleeve 18b and will have key 46 disposed therein in a similar manner as was done in sleeves 18 and 18a. The outboard end of sleeve 18b has a cap 158 connected thereto. Cap 158 is shown welded as at 160 to the sleeve 18b but it is understood that the cap can be suitably connected as desired in other ways as by threaded connection. Cap 158 has a drilled hole 162 through which a bolt 69 can pass to be engaged in the threaded hole 65 in the shaft 33. A tapped hole 164 is disposed outwardly of hole 162 and if after the unit 16 is assembled bolt 69 can be removed from engagement with shaft 33 and threadedly connected into hole 164 with its end bearing against the shaft 33 so that on turning bolt 69 the sleeve 18b and unit 16 will be jacked off the shaft 33.

Hub 22 is shown in FIGURE 7 having a collar 120 thereon through which a threaded bore 100 extends. Bolt 52 is engaged in bore 100 to compress the split 102. Axially extending threaded bores 104 having bolts 108 therethrough are used to secure driven pulley 24 onto the tapered section 106. It is understood that while a separate hub is shown and described that it is entirely within the scope of this invention to provide for the use of an integral hub and pulley described hereinafter and such use would not change the operation or purpose of the present invention.

An integrally formed hub 22a is illustrated in FIGURE 14 in which driven pulley 24a has a multiple groove periphery 170 with grooves 172 therein. Hub 22a has a keyway 174 in which key 176 will be disposed to connect it to sleeve 18b and tapped hole 178 will have set screw 44a disposed therein during operable assembly. It is understood that while a grooved periphery 170 is shown any suitable periphery can be used dependent on the type belt to be used. Furthermore, the inner diameter of the hub can be bored to suit the outer diameter of the sleeve, for example, if sleeve 18b were used the diameter would correspond to section 144 of sleeve 18b.

FIGURE 11 shows another form of unit 16 in which a stripper pulley 180 is connected to clutch 60. This stripper pulley 180 is especially adapted for use with cotton carding machines in which it supplies power for the card cleaning operation. Motor 30 is shown mounted on bracket member 20c which is connected to sleeve 18b. Pulleys 24a and 68 are connected to sleeve 18b by woodruff keys 176 and 177 respectively. Note that in this configuration a positive belt 28a is used.

*Assembly Operation*

The factory assembled shaft mount integral drive unit 16 on reaching the site having the driven machinery 32 is readily assembled on such machinery by simply slipping sleeve 18 or 18a or 18b whichever the case may be onto shaft 33 and securing it thereto. Torque arm 42 is then connected between the frame member 20 or 20b or 20c or 20a whichever the case may be and shroud 43 of the machinery 32. The various assemblies are shown in FIGURES 4, 9 and 11 and it is understood that it is within the scope of this invention to interchange the components and modify the construction. The switch is then connected to a source of power (not shown).

As an added safety feature cover 34 is provided when desired to enclose belt 28. The cover front 36 has a hinge 38 thereon which provides for lifting thereof and permits inspection of unit 16 or connection of auxiliary pulley 68. Thus during use of auxiliary pulley 68 or during disengagement of unit 16 from shaft 33 there is no need to first remove the cover 34 before going to either of these operations.

It will be understood that this invention is not to be limited to the specific construction or arrangement of parts shown but that they may be widely modified within the invention defined by the claims. Furthermore, it is obvious that the various components can be interchangeably used in the various forms of this invention.

What is claimed is:

1. A shaft mount integral drive mechanism for driving a shaft on which the mechanism is mounted comprising:
    (a) a frame means,
    (b) a motor mounted on the frame means,
    (c) a first pulley connected to the motor,
    (d) a sleeve means having one end thereof closed,
    (e) a second pulley connected to the sleeve means,
    (f) a pair of holder elements rotatably mounted on the sleeve means, one holder element on each side of the second pulley,
    (g) each of said holder elements being connected to the frame means whereby the frame straddles the second pulley in balanced position,
    (h) belt means drivingly connecting the first pulley and the second pulley whereby motive power will be transmitted from the first pulley to the second pulley and to the sleeve means connected thereto,
    (i) the closed end of the sleeve means having a hole therein,
    (j) means extending through the last mentioned hole in the closed end of the sleeve means and in the sleeve means mounted on the shaft, said means adapted to threadedly engage the shaft to prevent said mechanism from being disengaged from the shaft,
    (k) means of connecting the sleeve means to the driven shaft so that power will be transmitted from the motor, the first and second pulleys, and the sleeve means to the driven shaft,
    (l) a torque arm connected to the frame to maintain the frame in an upright position relative to the sleeve and the shaft.

2. The combination claimed in claim 1 wherein:
    (a) the sleeve means has a threaded hole in the closed end thereof adjacent the last mentioned hole of the sleeve means,
    (b) threaded means turnably engageable in the threaded hole and adapted to bear against the shaft to urge said mechanism to unseat from the shaft.

References Cited by the Examiner
UNITED STATES PATENTS

| | | | |
|---|---|---|---|
| 1,395,913 | 11/21 | Ford | 74—230.3 X |
| 1,445,947 | 2/23 | Hillix | 74—625 |
| 1,820,061 | 8/31 | Flagg | 74—421.5 |
| 2,116,166 | 5/38 | Christian | 74—421 |
| 2,161,429 | 6/39 | Pilkington | 74—242.9 |
| 2,168,501 | 8/39 | Stoyanowski | 74—611 X |
| 2,186,808 | 1/40 | Pilkington | 74—242.9 |
| 2,556,259 | 6/51 | Doris et al. | 74—242.9 |
| 2,606,453 | 8/52 | Firth | 74—421 |
| 2,655,818 | 10/53 | Bodle | 74—421 |
| 2,736,205 | 2/56 | Dunne | 74—230.3 |
| 2,763,158 | 9/56 | Firth | 74—230.3 |
| 2,775,137 | 12/56 | Chung | 74—584 |
| 2,832,229 | 4/58 | Rieser | 74—421 |
| 2,886,977 | 5/59 | Van Ausdall | 74—217 |
| 2,939,330 | 6/60 | Margetts | 74—411 |
| 3,051,010 | 8/62 | Blomgren et al. | 74—217 |

DON A. WAITE, *Primary Examiner.*